United States Patent [19]

Eisentraut

[11] 3,776,698
[45] Dec. 4, 1973

[54] TEST FOR THYROID HORMONE

[75] Inventor: Anna M. Eisentraut, Dallas, Tex.

[73] Assignee: Nuclear-Medical Laboratories, Inc., Dallas, Tex.

[22] Filed: Jan. 24, 1972

[21] Appl. No.: 220,458

[52] U.S. Cl. .................. 23/230 B, 260/519, 424/1, 424/111, 424/357, 250/71 R
[51] Int. Cl.. C07c 101/72, G01n 33/16, G21h 5/02
[58] Field of Search ...................... 23/230 B; 424/1, 424/111, 357; 210/37; 260/519

[56] References Cited
UNITED STATES PATENTS
3,389,968   6/1968   Masen .............................. 23/230 B
3,471,553   10/1969  Bittner .............................. 210/37 X OTHER PUBLICATIONS
Aloe Scientific, Catalog 103, 1952, pages 1,028, 1,029, 1,090, 1,091 relied on.

*Primary Examiner*—Morris O. Wolk
*Assistant Examiner*—R. M. Reese
*Attorney*—D. Carl Richards et al.

[57] ABSTRACT

Method for separating thyroid hormone from blood serum, which is particularly suitable for use in an improved T-4 test procedure. The improved T-4 test procedure includes an extraction step whereby thyroid hormone (thyroxine) is initially extracted from a blood sample by admixing the sample with an acidic solution to free the thyroid hormone from hormone-binding globulin in the sample, and thereafter the acidic solution containing the serum components is contacted with a suitable sorbent for the thyroid hormone, such as a particulate inorganic crystalline sorbent material. The sorbent containing the hormone is then separated from the liquid and admixed with an alkaline solution to cause elution of the thyroid hormone from the sorbent. Next, a predetermined amount of thyrobinding globulin and radioisotope-labeled thyroid hormone and sorbent is mixed in the liquid, the liquid adjusted to an optimum pH, and the sorbent is separated from the supernatant fluid and either the supernatant fluid or the sorbent is counted in a scintillation counter.

17 Claims, No Drawings

TEST FOR THYROID HORMONE

This invention relates to the separation of thyroid hormone from hormone-binding globulin in a blood sample. In another aspect, this invention relates to diagnostic tests for determining the level of thyroid hormone within a body fluid. In still another aspect, this invention relates to an improved test for measuring total thyroid hormone in a body fluid.

Various diagnostic tests are known in the art for determining thyroid function. These tests include the basal metabolism test, the thyroid uptake test and various colorimetric and chemical procedures for determining the level of thyroxine iodine in the blood. Among the most accurate tests available are the diagnostic tests which utilize radioisotope-labeled hormone to indirectly determine the level of thyroid hormones, thyroxine ($C_{15}H_{11}I_4NO_4$), and triiodothyronine ($C_{15}H_{12}I_3NO_4$) present in body fluids. Specifically, these tests include a test commonly referred to as the T-3 test which measures the unsaturated binding capacity of thyrobinding globulin and other proteins within a body fluid such as blood, and the test commonly referred to as the T-4 test which measures the total quantity of hormone within a sample of blood serum.

Both the T-3 and T-4 tests include the steps of adding the radioisotope-labeled hormone to a solution containing a sample of hormone produced within the body and thyrobinding globulin, separating the resulting thyrobinding globulin containing bound hormone from the resulting unbound hormone, and counting the radioactivity of either the bound or unbound hormone. This counting procedure will indicate the amount of endogenous hormone which is bound to the natural globulin and protein-binding sites within the blood.

Thus, both the T-3 and T-4 tests depend for their accuracy upon the efficient separation between the bound and unbound thyroid hormone in the test sample. The conventional methods for removal of these hormones include ion exchange resins such as the ion exchanger having strongly basic amino or quatenary ammonium groups as disclosed in U.S. Pat. No. 3,414,383. These organic ion exchange resins can be either in loose forms or incorporated in polyurethane sponges as disclosed in U.S. Pat. No. 3,206,602, or enclosed in porous bags or the like. Other such conventional methods involve a selective adsorption of the free hormones by charcoal which has been coated with suitable proteins or molecular sieves such as Sephadex.

Recently, an improved thyroid hormone test has been developed and is set forth in copending U.S. Pat. application Ser. No. 846,289, filed July 30, 1969 now U.S. Pat. 3,666,854. This new test includes sorbing the free hormones on a particulate, inorganic crystalline lattice material, such as magnesium silicate, for example. This new test is neither time nor temperature dependent, in that it can be carried out at any convenient room temperature over any convenient time period to obtain very accurate results. The sorbent will quickly and efficiently bind only the free or nonprotein bound thyroid hormone within a sample fluid. This test normally includes the admixing of the dry sorbent material with a suitable solution, such as a barbital buffer solution containing both the free hormones and the hormones bound to the natural binding sites (thyrobinding globulin and other proteins), thoroughly admixing until sorption of the free hormones and then separation of the sorbent from the resultant supernatant fluid.

Due to several factors which are discussed below, the T-3 test has generally become more widely employed that the T-4 test. However, in order to obtain a complete indication of the thyroid activity within the body, it is generally necessary to correlate the results of the T-3 test with the value of the total thyroid hormone content in the blood. Specifically, it is known that thyroid hormones do not exist freely in large amounts in the plasma but are bound to specific protein fractions therein. The hormones are transported throughout the body in this bound form. The binding strength of the protein fraction is generally constant within narrow limits in most humans. Thus, a measure of the unsaturated binding capacity of a sample by using a T-3 test will generally give an indication of the quantity of thyroid hormone present in the blood. However, the T-3 test does not determine the total quantity of thyroid hormone in the blood, and certainly does not directly measure the amount or quantity of the natural binding sites within the blood. Thus, in order to get a complete indication of thyroid activity, it is necessary to correlate the measurement of unsaturated binding capacity for thyroid hormone with the total quantity of thyroid hormone in a sample. The T-4 test, which is a measure of the total amount of thyroid hormone in the blood can be used in conjunction with the T-3 test in order to get a true measure of the thyroid function.

Conventional T-4 tests include the stpes of initially extracting the thyroid hormone from a sample of blood serum. This extraction step is usually accomplished with an organic solvent and serves the purpose of isolating the thyroid hormone from the proteins within the blood. After the extraction, the extractant is normally placed within a test tube in a temperature controlled zone and the organic solvent evaporated therefrom to leave a dry residue of the thyroid hormone. Next, the thyroid hormone is solubilized usually within a buffer containing known quantities of thyrobinding globulin and a tracer quantity of radioisotope-labeled thyroid hormone. Next, a sorbent material is utilized to separate the free thyroid hormone from the resulting bound thyroid hormone within the sample either the sorbent or the resulting supernatant fluid is measured by suitable means, such as with a scintillation well counter. Thereafter, the total amount of thyroid hormone within the sample is determined by correlation with a standard curve which is based upon radioactive counts present in samples containing known quantities of thyroid hormone.

Heretofore, most conventional T-4 tests have not been extremely reliable because of the failure to obtain reproducible and correlatable results. One of the problems in these tests is that the percent recovery of thyroid hormones from the initial extraction step must be calculated and applied to the measured values. The percent recovery varies greatly. When utilizing an alcohol such as ethanol or Formula 3A, the most widely used and acceptable extractants heretofore known in the art, the mean recovery value of the thyroid hormone is approximately 75 percent. However, the overall recovery is 75 percent ± 13.5 percent, or a range of from 61.5 to 88.5 percent. The recovery of the thyroid hormone varies from day to day and certainly with each serum which is tested. Because of the unpredictability of the recovery value during the extraction step, authorities such as Ekins et al Clin. Biochem.2 253, 1969, feel that it is mandatory to measure the individual recovery on each serum in order to obtain accurate results with the T-4 test. This additional procedure of determining the individual recovery for each serum is considered prohibitive in most clinical circumstances.

The unpredictable extraction efficiency described above coupled with the burdensome and tedious techniques utilized with conventional T-4 tests whereby the extraction solvent must be evaporated to leave a dry residue of the extracted thyroid hormone and thereafter the tests run at closely controlled temperature and time during the sorption steps have resulted in the T-4 test not being widely accepted. This is so, even though the T-4 test has been recognized as being extremely valuable.

Therefore, one object of this invention is to provide a novel method of separating thyroid hormone from blood serum.

Another object of this invention is to provide an improved T-4 test method.

Another object of this invention is to provide an improved T-4 test method which yields highly reproducible results, which test is basically not time nor temperature dependent, wherein the necessity of applying a percentage recovery value to the thyroid hormone from the blood serum to a set of standard data is eliminated, and wherein the evaporation step for removing an extraction solvent is eliminated.

According to one embodiment of this invention, a novel method is provided for separating thyroid hormone from hormone-binding globulin in a serum sample which includes initially admixing the serum sample with a first solution maintained at a suitable pH to effect the separation of the thyroid hormone from the hormone-binding globulin. Next, the first solution containing the free thyroid hormone and the hormone-binding globulin is thoroughly admixed with a sorbent material which will selectively sorb the thyroid hormone at the pH of the first solution to effect the sorption of the hormone. After separation of the first solution from the sorbent containing the hormone, the sorbent is contacted with a second solution maintained at a pH to cause elution of the hormone from the sorbent to yield a solution containing thyroid hormone which is free of hormone-binding globulin.

According to another embodiment of this invention, a novel T-4 test is provided which utilizes the separation method of said one embodiment to initially separate the thyroid hormone from the hormone-binding globulin. After this initial separation, a predetermined amount of thyrobinding globulin and a tracer quantity of radioactive-labeled thyroid hormone is added to the solution containing the separated thyroid hormone and the solution is allowed to equilibrate. After the equilibration, the free thyroid hormone is separated from the bound hormone by admixing the sorbent therewith, and then centrifuging the mixture. Next, either the sorbent or the supernatant fluid is counted in a scintillation well counter and the results compared to a standard curve to determine the quantity of thyroid hormone which was present in the serum sample.

According to a further embodiment of the invention, a novel method of preparing a standard serum to be used in a thyroid hormone test is also provided.

According to a still further embodiment of this invention, a novel test kit apparatus is provided for determining the quantity of thyroid hormone in a serum sample.

The novel separation technique which is carried out in accordance with said one embodiment preferably comprises the use of an acidic solution to initially break the bonds between the thyrobinding globulin (TBG) and the thyroid hormone (thyroxine). This step is carried out by initially admixing suitable amounts of an acidic solution with a serum sample. The acidic solution is generally maintained at a pH within the range of 1.0 to 3.0 and more preferably within the range of 1.4 to 2.2. Any suitable acidic solution which is nondeleterious to thyroid hormone and the sorbtion process can be used within the scope of this invention. For example, aqueous solutions of inorganic acids such as hydrochloric acid, phosphoric acid, sulfuric acid and the like, as well as aqueous solutions of organic acids such as acetic, citric, barbituric and the like can be used in the scope of this invention. The acidic solution can contain suitable buffering amounts of a buffering agent. Suitable buffering agents include the salts of weak acids. Examples of such buffering agents include glycine, sodium phosphate, potassium phosphate, sodium barbital and the like. Also, the ionic strength of the acidic solution can be maintained by the presence of suitable materials such as neutral salts, e.g., NaCl, KCl and the like. The molar quantity of the acid in the solution can be adjusted as desired to yield the final working pH which is required (a pH within the range of from 1.0 to about 3.0 preferably within the range of from about 1.4 to 2.2). The other agents which can be added to the solution (the buffering agent or the ionic strength maintaining agent) can be added in suitable effective amounts (generally from about 0.2–5 moles per mole of acid).

A suitable amount of the acidic solution can be admixed with the serum sample but generally from about 2 to about 50 volumes of the acidic solution are used for each volume of serum. The serum is admixed with the acidic solution for a sufficient time to effect the separation of the thyroid hormone and the thyrobinding globulin. (generally for a period of less than about 1 hour, e.g., 15 seconds).

After the thyroid hormone is separated from the thyrobinding globulin, the resulting solution is thoroughly admixed with a sorbent material which will selectively sorb the thyroid hormone at the acid pH but which will desorb, or not retain it at a higher pH. A preferred such sorbent material which is preferably used in the scope of this invention is a particulate inorganic crystalline lattice material.

The particulate inorganic crystalline lattice material which can be used in the scope of this invention includes the phosphates, oxides, hydroxides, silicates, carbonates, aluminates, and sulfates, of the metallic elements in Groups IA, IIA, IIIA, IIB and VIII of the Periodic Table as illustrated on Page B-2 of the *Hanbook of Chemistry and Physics*, Chemical Rubber Publishing Company (1964). Examples of suitable materials include calcium carbonate, calcium phosphate, calcium oxide, calcium hydroxide, calcium silicate, calcium aluminate, calcium sulfate, magnesium carbonate, magnesium phosphate, magnesium oxide, magnesium hydroxide, magnesium silicate, magnesium aluminate, magnesium sulfate, aluminum carbonate, aluminum phosphate, aluminum oxide, aluminum hydroxide, aluminum silicate, aluminum sulfate, potassium carbonate, potassium phosphate, potassium oxide, potassium hydroxide, potassium silicate, potassium aluminate, potassium sulfate, iron carbonate, iron phosphate, iron oxide, iron hydroxide, iron silicate, iron aluminate, iron sulfate, barium carbonate, barium phosphate, barium oxide, barium hydroxide, barium silicate, barium aluminate, barium sulfate, zinc carbonate, zinc phosphate, zinc oxide, zinc hydroxide, zinc silicate, zinc aluminate, zinc sulfate, and mixed salts thereof.

Some specific examples of commonly occurring materials which can be used within the scope of this invention include: Opal, $Si(OH)_4 + SiO_2$; Waterglass, $Si_4O_9 \cdot Na_2$; Kaolinite, $Al_2(SiO_5)(OH)_4$; Dickite, $Al_2(Si_2O_5)(OH)_4$; Nacrite, $Al_2(Si_2O_5)(OH)_4$; Metahalloysite, $Al_2(Si_2O_5)(OH)_4$; Halloysite, $Al_2(SiO_3)(OH)_3$; Attapulgite, $Mg_3(Si_4O_{10})(OH)_2(OH) \cdot 2H_2O$, $Al(Si_4O_{10})(OH)_2$; Pyrophyllite, $Al_2(Si_4O_{10})(OH)_2$; Talc, $Mg_3(Si_4O_{10})(OH)_2$; Montmorillonite, $Al_2(Si_4O_{10})(OH)_2 \cdot xH_2O$, $Mg(Si_4O_{10})(OH)_2 \cdot xH_2O$; Nontronite, $Fe_2(Si_4O_{10})(OH)_2 \cdot xH_2O$; $Mg(Si_4O_{10})(OH)_2 \cdot xH_2O$; Beidellite, $Al_2(Si_4AlO_{10})(OH)_2 \cdot xH_2O$, $Mg(Si_4AlO_{10})(OH)_2 \cdot xH_2O$; Saponite, $Mg_3(Si_4O_{10})(OH)_2 \cdot xH_2O$, Illite, $K_y \cdot Al_2(Si_{4-y})O_{10}$, $Fe_2 \cdot Mg_2 \cdot Mg_3(Si_{4-y} \cdot Al_y)O_{10}$; Muscovite, $K \cdot Al_2(AlSi_3O_{10})(OH)_2$; Paragonite, $Na \cdot Al_2(AlSi_3O_{10})(OH)_2$; Phlogonite, $K \cdot Mg_3(AlSi_3O_{10})(OH)_2$; Biotite, $K \cdot (Mg_1Fe)_3(AlSi_3O_{10})(OH)_2$; Margarite, $Ca \cdot Al_2(Al_2 \cdot Si_3 \cdot O_{10})(OH)_2$.

The most preferred inorganic crystalline sorbent materials include the silicates, particularly magnesium silicate and aluminum silicate. Other preferred sorbent materials are calcium phophate, silicic acid, aluminum hydroxide, calcium oxide, and magnesium carbonate and magnesium oxide.

Ideally, the size of the crystalline sorbent material should allow rapid centrifugation. Also the material should remain packed while inverted and yet be easily resuspended. Thus, the preferable diameter range is $10^{-4}$ to $10^{-3}$ centimeters, although the sorbent particles can have a size of $10^{-7}$ to $10^{-1}$ centimeters.

Any suitable amount of the particulate inorganic cyrstalline sorbent material can be admixed with the acid buffer containing the serum to effect a separation of the thyroid hormone therefrom. Generally, it is preferred to utilize from about 20 to 75 grams of sorbent per liter of the acidic solution. It is generally only necessary to thoroughly admix the particulate inorganic crystalline sorbent material with the acidic solution for a time sufficient to disperse the sorbent within the buffer. For example, the mixture can be uniformly shaken for about 15 seconds. After the sorbent and the acidic solution are thoroughly mixed, the sorbent is separated from the buffer by suitable techniques such as centrifugation. The supernatant fluid is the separated from the sorbent containing the thyroid hormone.

Next, the thyroid hormone is removed from the sorbent material by a process of thoroughly admixing the sorbent with an alkaline solution. The alkaline solution is generally maintained at a pH within the range of from about 10 to 13 and preferably within the range of from about 11.5 to 12.5. Any suitable basic solution which is nondeleterious to the thyroid hormone and the sorbent can be used within the scope of this invention. For example, aqueous solutions of hydroxides such as the alkaline hydroxides, e.g., sodium hydroxide, potassium hydroxide, or other bases such as ammonium hydroxide can be utilized within the scope of this invention. These materials can be buffered with suitable buffering agents, e.g., salts of weak acid. Examples of suitable buffering agents include sodium bicarbonate, sodium phosphate, sodium barbital and the like. Also, the ionic strength of the alkaline solution can be maintained by the presence of suitable materials such as neutral salts, e.g., NaCl, KCl and the like A suitable molar quantity of the base can be combined within water to yield the desired working pH of the system (a pH generally within the range of from about 10 to about 13 and more preferably within the range of from about 11.5 to 12.5). The buffering or ionic strength agent can be added to the solution in a suitable effective amount (generally from about 0.2 – 5 moles per mole of the base).

Generally the amount of the alkaline solution which is added to the inorganic crystalline sorbent material can correspond with the amount of the acidic solution which was utilized in the prior step. The sorbent is thoroughly admixed with the alkaline solution for a sufficient tine to allow the thyroid hormone to elute therefrom into the buffer. The elution is substantially complete within a few seconds (for example about 15 seconds). The resulting mixture can now be centrifuged and the supernatant fluid containing the thyroid hormone can now be separated from the inorganic crystalline sorbent material and used as desired. For example, the thyroid hormone can be utilized in the production of pure thyroxine or in a T–4 test as set forth in a preferred embodiment of this invention.

Thus, according to a preferred embodiment of this invention, the above-described procedure for separation of the thyroid hormone from thyrobinding globulin can be used directly in a novel T–4 test. The resulting test procedure is advantageous over known procedures in that it is a much more rapid test procedure but yet provides highly reproducible results. Thus, by using the above-described separation technique, the necessity for utilizing an extraction procedure for precipitating thyrobinding globulin from the thyroid hormone and then later evaporating the extraction solvent to yield a residue of dry thyroid hormone is totally eliminated. In addition, the necessity for calculating the total recovery of the extracted thyroid hormone and applying it to the results of the test is also obviated.

The novel T–4 test procedure can be carried out with the novel test kit of the subject invention and standard laboratory apparatus. The test kit of the subject invention normally comprises an acidic solution contained within suitable vials. The acidic solution generally has a pH within the range of from 1.0 to 3.0 and preferably within the range of 1.4 to 2.2. In addition, a particulate inorganic crystalline sorbent material is provided in packaged units. The particulate inorganic crystalline sorbent material is provided either in powdered or tablet form or dispersed within the acidic solution. Also provided in an alkaline solution which has a pH within the range of from about 10.0 to about 13. Other constituents of the kit include known amounts of a standard thyrobinding globulin, tracer amounts of a radioisotope-labeled thyroid hormone and standard sera.

A typical procedure for carrying out the novel T–4 test procedure of the subject invention is to initially utilize 37.5 grams of a suitable particulate inorganic crystalline sorbent material such as magnesium silicate having a particle size in the range of from about $10^{-7}$ to $10^{-1}$ centimeters as a sorbent material. Preferably, the sorbent material for each test sample is in loose form and dispersed within a suitable volume such as 2 milliliters of KCl–HCl aqueous acidic solution. The acidic solution can comprise 0.05M KCl and 0.05M HCl and have a pH of 1.5. The aqueous acidic solution and the loose particulate inorganic crystalline sorbent material are added to a vial such as a test tube. Next, 0.1 ml of sample serum is added to the acidic solution. It is noted that other volumes of serum can be utilized. The 0.1 ml of serum is used in the preferred embodiment because reproducible measurement of the snaller volumes is more difficult. Larger volumes of serum can be used with a proportionate increase in the volume of acidic solution and amount of sorbent.

After the serum has been added to the acidic solution, the vial is shaken for a few seconds (about 15 seconds is sufficient) to thoroughly admix the serum and the acidic solution and the particulate inorganic crystalline sorbent material. This will allow sufficient time for the acid to break the bonds between the thyroid hormone (thyroxine) and the thyrobinding globulin, and for the free thyroid hormone to become sorbed by the particulate inorganic crystalline sorbent material. It is generaly preferable not to allow the acidic solution and the serum to remain in contact for more than about 1 hour. During this procedure, the particulate inorganic crystalline sorbent material picks up approximately 80 percent of the thyroid hormone from the sample. Next, the particulate inorganic crystalline sorbent material is separated from the acidic solution by suitable means such as centrifugation and the resulting supernatant is separated from the sorbent.

Next, according to a preferred mode of operation, an alkaline solution is added to the particulate inorganic crystalline sorbent material to elute the sorbed thyroid hormone therefrom. For example, 2 milliliters of an aqueous solution containing 0.15M KCl and 0.12M NaOH having a pH of about 12.2 is added to the vial containing the sorbent packed in the bottom thereof. After the alkaline solution has been added to the sorbent in the vaial, the vial is shaken to disperse the sorbent therewithin. This will allow the alkaline solution to elute the thyroid hormone from the sorbent material. The elution is complete within a few seconds (about 15 seconds is sufficient). At this point, the vial is centrifuged to pack the particulate inorganic crystalline sorbent material in the bottom of the vial and the resulting alkaline solution containing the eluted thyroid hormone is ready to receive a storage of thyrobinding globulin and a tracer quantity of radioisotope-labeled thyroid hormone.

Either whole human or some animal sera or a lyophilized commercially prepared human alpha globulin fraction can be used as a source of thyrobinding globulin. It is preferred that the thyrobinding globulin be contained within a solution having a sufficient pH to yield a resulting pH of 7.5 to 8.5 of the combined solutions which will provide optimum conditions for competitive binding of thyroid hormone with thyrobinding globulin. For example, 2 milliliters of an aqueous solution containing 0.035M sodium barbital and 0.027M HCl having a pH of 7.4 and containing 0.01–0.08 weight percent of the human alpha globulin is added to the alkaline buffer containing the eluted thyroid hormone. However, if desired, whole human sera can be diluted from 1–50 to about 1–200 times with the barbital-HCl solution, and used at this point as the source of thyrobinding globulin. In addition, a tracer amount of radioisotope-labeled thyroid hormone is contained within this solution.

Any radioactive isotope of iodine, tritium, or carbon can be used. It is preferred that a hormone is utilized which is labeled with either radioactive $I^{131}$ or $I^{125}$. The two solutions are combined and thoroughly intermixed by swirling to allow competitive binding between the labeled and unlabeled thyroid hormone and thyrobinding globulin.

It is generally desirable to put a pH indicator which is nondeleterious to the reaction within the alkaline solution. The indicator will assure that the acid and basic solutions will not be confused during the test. A suitable indicator which can be used in the scope of this invention is thymolphthalein. Generally, approximately 0.0001 percent in the alkaline solution will assure that the alkaline solution will remain a blue color above pH 10, but once the pH of the alkaline solution begins to drop after addition of the solution containing the thyrobinding globulin and the radioactive-labeled thyroid hormone, the solution will become colorless.

After this solubilization and equilibration step (about 5 minutes after the mixing), the vial is shaken to allow the inorganic crystalline sorbent material to be placed thoroughly in contact with the solution. It is preferred to shake the vial about 15 seconds to accomplish this admixing. The loose sorbent and the solution are allowed to remain in contact for a sufficient time to allow the sorbent material to bind the free labeled and unlabeled thyroid hormone. It is generally preferred to let the sorbent remain in contact with the solution for about 30 minutes.

After this binding step, the vial is centrifuged and the supernatant fluid is separated from the sorbent by decantation and either the resultant supernatant fluid or the sorbent. preferably the sorbent, is counted in a scintillation well counter. The reading of the scintillation counter is compared to the total number of counts (the total amount of tracer radioisotope-labeled thyroid hormone) which were initially added to obtain the percent uptake values. The total counts per minute are determined such as by measuring the total counts of the tracer quantity of radioisotope-labeled thyroid hormone within a quantity of buffer material equal in volume to that quantity of material (whether sorbent material or liquid material) which is being counted in the scintillation well counter for each test sample. This is conveniently done by measuring a quantity of liquid such as the barbital buffer solution which is equal in volume to the amount of sorbent material, and adding the standard amount of radioisotope-labeled thyroid hormone thereto and counting in a scintillation well counter. The percent uptake values are then correlated with standard values obtained by measuring percent uptake of standard samples containing known amounts of thyroid hormone to thereby determine the amount of thyroid hormone within the sample.

The preparation of the standard samples and the counting techniques are preferably carried out by the same basic procedure as described above for the unknowns. The standard is pooled normal sera which has been assayed by carefully controlled independent methods. Thereafter, pure crystalline thyroxine diluted in 0.25 percent bovine albumin in water is added to the serum to yield the desired final concentration. Preferably each of the test kits of the subject invention is provided with 3 standard sera containing measured quantities of thyroxine which would be equivalent to 6, 12 and 18 micrograms percent serum, as well as a zero standard test serum containing no thyroxine.

After each of the standard sera is prepared, they are processed as described above from the initial separation steps through the counting step in the scintillation counter. When the standards are processed in this manner, any possible errors are eliminated such as daily variations often noted in recovery of thyroxine in the initial thyroxine separation step. The initial separation of thyroxine in the standard area automatically nullifies such differences. In addition, the extraction loss as described above, need not be applied to the final calculations since the percent recovery in the standard sera is almost exactly identical to the average value obtained in the samples and does not vary as do conventional extraction loss values.

In accordance with one embodiment of this invention, a novel procedure is provided for producing the zero standard control serum. The preparation of a standard control serum which contains no thyroxine is necessary in order to obtain the zero point for the standard curve in the method as set forth above. In addition, the use of the zero standard control serum is also necessary to obtain accurate readings of the hyperthyroid sera. Thus, when the zero standard control serum is obtained, hyperthyroid sera can be diluted by a known factor with the zero standard control serum. The T–4 tests are then run in the above-described manner and compared with the standard values obtained from the curve. After the reading is obtained from the standard curve, the dilution factor is applied to the reading. For example, if the hyperthyroid serum is diluted with an equal volume of zero standard control serum, the results obtained from the standard curve are merely multiplied by 2 to give the true reading with the hyperthyroid serum.

The zero standard serum is prepared in accordance with one embodiment of this invention by contacting a quantity of acidified serum with the particulate inorganic crystalline sorbent material as recited above to separate the thyroid hormone therefrom. Thereafter, the sorbent material containing thyroid hormone is separated such as by centrifugation from the supernatant fluid and is discarded. This procedure is repeated on the supernatant from 1 to about 5 times until all of the thyroid hormone has been removed therefrom. The preferred technique for producing the zero control serum from a normal serum having a pH of about 8 and containing about 8 micrograms percent of thyroxine includes initially adjusting the pH of the normal serum to about 4 (generally to a value of 3–6) with 2N HCl. After this initial pH adjustment, one part by weight of the particulate inorganic crystalline sorbent material is thoroughly admixed with 4 parts by weight of the serum. The ratio of serum to sorbent can be in the range of from 1:1 to 1:10. The sorbent-serum mixture is constantly mixed for approximately 5 hours (generally from 2 to about 8 hours) by a rotator or a magnetic mixer or the like. After this 5 hour period, the sorbent is separated from the serum by a suitable method, such as centrifugation. Using the abovedescribed normal serum, the first sorbent treatment will remove approximately 6 micrograms percent of the thyroid hormone therefrom. Next, a fresh one part by weight of sorbent is added to the supernatant and the material is again mixed for approximately 5 hours. This procedure can be repeated one or more times to remove all of the thyroxine from the serum.

The sequential sorbent contact steps will yield a serum sample containing no thyroxine and having a pH of approximately 3–6. Therefore, it is next desired to adjust the pH of the resulting zero standard to a pH in the range of 8–8.5 by the addition of an alkaline material thereto. Thus, after the thyroxine has been removed from the serum, the pH of the remaining serum is adjusted to about 8 by the addition of 2N NaOH. It is noted at this point that if the initial pH during the separation is adjusted to a figure substantially lower than about 3, then the final adjustment of the pH to about 8 will cause most of the proteins to precipitate therefrom.

After the pH of the zero control serum is adjusted up to about 8, it is preferred to add a serum preservative thereto. For example, 0.1 weight percent of sodium azide can be added to the serum.

It is noted that the procedures set forth above are given for illustrative purposes only and that various concentrations of other reactants can be utilized within the scope of this invention. Furthermore, different procedures can be utilized to carry out the T–4 test as described above in accordance with this invention. For example, in the initial steps after the free thyroid hormones have been bound by the inorganic crystalline sorbent material, the step of eluting the thyroid hormone from the sorbent can be carried out simultaneously with the competitive binding step. In this instance, the separate step of eluting the thyroid hormone from the sorbent with the alkaline solution is omitted, and an alkaline solution having a pH of from 7.5 to 9.2 preferably is about 8.6 and containing the known quantity of thyrobinding globulin and the radioisotope-labeled thyroid hormone can be added directly to the sorbent. The buffer solution will not only elute the thyroid hormone in the sorbent, but the presence of the thyrobinding globulin and the radioisotope-labeled thyroid hormone will simultaneously result in competitive binding between the eluted thyroid hormone and the radioisotope-labeled thyroid hormone with the thyrobinding globulin. Thus, the thyroid hormone is eluted from the sorbent and immediately competes for the thyrobinding globulin. This alternate procedure can be utilized when it is desired to run very quick thyroid hormone tests. However, this alternate procedure is not preferred, since there is some sensitivity loss and changes in binding are noted when unusual time lapses are introduced into the tests.

In addition, the novel T–4 test procedure can be carried out in a column arrangement. In this instance, the inorganic crystalline sorbent material is diluted with an inert diluent such as cellulose of a particle size of from about 10 to 200 microns. The weight ratio of the particulate inorganic crystalline sorbent material to the inert diluent can be from about 1:30 to about 1:40 and preferably about 1:20. After the mixture between the inert diluent and the particulate inorganic sorbent material is made, the material can be placed within the column which can comprise a cylindrical column having a porous inlet and an outlet adapted to retain the sorbent and diluent within the column. When utilizing the column, the test can be carried out as before, except the solutions are merely passed through the column. For example, in the step of separating the thyroid hormone from the thyrobinding globulin in the sample, the serum is initially added to the acidic solution, mixed, and then poured through the column, and the liberated thyroid hormone will be sorbed by the particulate inorganic sorbent material contained therewithin. Next, it is preferred that the modification discussed above be utilized to elute and simultaneously bind by competitive binding the thyroid hormone in the column. Thus, in this instance, the predetermined amount of thyrobinding globulin together with the radioisotope-labeled thyroid hormone are added to an alkaline solution having a pH of about 8.6 and the resulting solution is passed through the column to cause elution of the thyroid hormone from the sorbent material and competitive binding of the eluted thyroid hormone and the radioisotope-labeled thyroid hormone with the thyrobinding globulin. Next, either the column or the supernatant passing through the column is counted in a scintillation counter.

The following examples are given to better facilitate the understanding of this invention and are not intended to limit the scope thereof.

EXAMPLE 1

To illustrate the efficiency of the separation between the thyroid hormone and thyrobinding globulin, several separations were carried out in accordance with this invention. Several acidic solutions were made up. Each contained 37.5 grams per liter (0.075 grams) of magnesium silicate crystalline lattice sorbent material U.S.P. grade aerosol cosmetic talc which was suspended therein by agitation. Two milliliters each of the homogenous suspension were added to individual vials. Next, 0/1 milliliters of a standard blood serum sample containing a trace of T-4 $I^{125}$ were admixed within the acidic solution in each vial and swirled for a few seconds. The vials were shaken for about 15 seconds to disperse the sorbent within the buffer, and centrifuged. The supernatant fluid was decanted. The hormone in each of the vials was then assayed to determine the average percent recovery of the thyroxine. The results of the test are set forth in TABLE I below:

TABLE I

| Buffer | Molarity | pH | Average Percent Recovery |
|---|---|---|---|
| glycine-HCl | 0.05, 0.05 | 1.7 | 83.3 |
| glycine-HCl | 0.05, 0.04 | 2.1 | 79.8 |
| citric acid-Na$_2$HPO$_4$ | 0.089, 0.02 | 2.6 | 79.1 |
| KCl-HCl | 0.025, 0.01 | 2.1 | 80.1 |
| KCl-HCl | 0.05, 0.10 | 1.3 | 82.9 |
| KCl-HCl | 0.05, 0.05 | 1.6 | 83.5 |

Thus, the above runs indicate that the acceptable recovery of the thyroxine from blood serum is obtained when utilizing various acidic solutions of various concentrations as the extracting medium. It is only advisable to utilize the same acidic solution when running the standards as when running the unknown samples.

EXAMPLE 2

Next, several T-4 tests were run on both low and high serum pools utilizing different alkaline elution solutions. In each instance, the thyroxine from the serum sample was sorbed on the particulate inorganic crystalline sorbent material by the procedure set forth in Example 1 and utilizing an aqueous acidic solution having a pH of 1.5 and containing 0.05M KCl and 0.05M HCl. In each instance after the thyroid hormone was obtained upon the sorbent material, 2 milliliters of the alkaline solution were added thereto in the vial and the mixture was shaken to disperse the sorbent within the eluting alkaline solution and thereafter centriguted. Next, 2 milliliters of an aqueous acidic barbital buffer pH 7.4 containing 0.035M sodium barbital and 0.027M hydrochloric acid, and 0.04 weight percent of thyrobinding globulin (TBG) as well as a tracer quantity of radioisotope-labeled thyroid hormone was added to each vial. After this, the supernatant fluid was swirled together and allowed to equilibrate for about 5 minutes and then the vials were shaken for about 15 seconds to disperse the sorbent therewithin. After this, each vial was allowed to stand for 30 minutes, centrifuged, the supernatant fluid decanted, and the packed sorbent counted in a scintillation well counter to obtain the percent uptake. The percent uptake of the high and low serum pools was graphed for each solution with the percent uptake on the ordinant and the total thyroxine (micrograms per 100 milliliters of serum) on the abscissa. The percent spread between the low and high pools were then determined. It is generally desirable to have as great a percent spread between the low and high pools as possible in order to obtain more accurate graph readings. The results of the test are set forth in TABLE II below:

TABLE II

| Aqueous alkaline buffer | Molarity | | pH | TBG barbital pH | Final pH | µg. percent | | Percent spread |
|---|---|---|---|---|---|---|---|---|
| | | | | | | Low serum pool | High serum pool | |
| NaHCO$_3$—NaOH | 0.0125, | 0.005 | 10.0 | 7.4 | 8.1 | 2.3 | 20 | 29.7 |
| Na$_2$HPO$_4$—NaOH | 0.50, | 0.007 | 11.0 | 7.4 | 8.0 | 2.3 | 20 | 20.8 |
| Na$_2$HPO$_4$—NaOH | 0.05, | 0.1 | 12.1 | 7.4 | 8.4 | 0 | 20 | 31.8 |
| KCl—NaOH | 0.05, | 0.01 | 11.9 | 7.4 | 7.6 | 0 | 20 | 33.1 |
| KCl—NaOH | 0.05, | 0.02 | 12.1 | 7.4 | 8.05 | 0 | 20 | 35.3 |
| KCl—NaOH | 0.05, | 0.02 | 12.1 | 7.4 | 8.05 | 2.3 | 20 | 32.9 |

As can be seen from the above Table II, various alkaline solutions can be utilized to obtain maximum elution of the thyroid hormone from the sorbent but yet yield a final pH after addition of the thyrobinding globulin and radioisotope-labeled hormone in its buffer solution which is optimum for competitive binding. It is desirable to have a final pH (after addition of the thyrobinding globulin and radioisotope-labeled hormone in the range of about 7.5 to about 8.5).

While this invention has been described in relation to its preferred embodiments, it is to be understood that various modifications thereof will now be apparent to one skilled in the art upon reading this specification and it is intended to cover such modifications as fall within the scope of the appended claims.

I claim:

1. A method of separating thyroid hormone from a serum sample containing said hormone and hormone-binding globulin comprising:

a. admixing said serum sample with a first solution having an acid pH sufficient to separate said thyroid hormone from said hormone-binding globulin;

b. admixing said first solution containing said serum with a particulate inorganic crystalline sorbent material selected from silicic acid and carbonates, phosphates, oxides, hydroxides, silicates, aluminates and sulfates of the metallic elements of Groups IA, IIA, IIIA, IIB, and VIII of the Periodic Table and mixed salts thereof to cause selective sorption of said thyroid hormone thereon, and separating said sorbent containing said thyroid hormone from said first solution;

c. admixing said sorbent containing said thyroid hormone with a second solution maintained at an alkaline pH to cause elution of said hormone from said sorbent; and d. separating said sorbent from said second solution containing said hormone.

2. The method of claim 1 wherein said first pH is within the range of from about 1 to about 3 and said second pH is within the range of from about 10 to about 13.

3. The method of claim 2 wherein said sorbent is magnesium silicate.

4. A method of separating thyroid hormone from a serum sample containing said thyroid hormone and hormone-binding globulin comprising:

a. admixing sufficient acid with said serum sample to separate said thyroid hormone from said hormone-binding globulin;

b. admixing the resulting acidified serum with a particulate inorganic crystalline sorbent material selected from silicic acid and carbonates, phosphates, oxides, hydroxides, silicates, aluminates, and sulfates of the metallic elements of Groups IA, IIA, IIIA, IIB and VIII of the Periodic Table and mixed salts thereof to selectively sorb said thyroid hormone thereon; and c. separating said sorbent containing said hormone from the remaining part of said serum.

5. The method of claim 4 wherein sufficient acid is added to said serum to yield the pH thereof at a value between about 3 and about 6.

6. The method of claim 5 further comprising contacting said remaining part of said serum with a new portion of said sorbent material to sorb further amounts of thyroid hormone and thereafter separating said sorbent from the second remaining part of said serum.

7. The method of claim 6 wherein said sorbent is magnesium silicate.

8. The method of claim 6 further comprising repeating said contacting with new sorbent material one or more times until said serum contains none of said thyroid hormone.

9. A method of measuring thyroid hormone in a serum sample containing said thyroid hormone and hormone-binding globulin comprising:

a. admixing said serum sample with an effective amount of an acidic solution sufficient to separate said thyroid hormone from said hormone-binding globulin;

b. admixing said acidic solution containing said serum with a particulate inorganic crystalline sorbent material selected from silicic acid and carbonates, phosphates, oxides, hydroxides, silicates, aluminates and sulfates of the metallic elements of Groups IA, IIA, IIIA, IIB, and VIII of the Periodic Table and mixed salts thereof;

c. separating said sorbent containing said bound thyroid hormone from said acidic solution;

d. admixing said sorbent with an effective amount of an alkaline solution to cause elution of said thyroid hormone into said alkaline solution;

e. equilibrating said alkaline solution containing said thyroid hormone with thyrobinding globulin and a radioactive isotope-labeled thyroid hormone;

f. thoroughly admixing the equilibrated solution with said particulate inorganic crystalline sorbent material to remove free thyroxine therefrom; and g. counting with a scintillation counter one of (1) free labeled thyroxine removed by said sorbent, and (2) labeled thyroxine remaining in said solution.

10. The method of claim 9 wherein said sorbent is magnesium silicate.

11. The method of claim 9 wherein said sorbent is magnesium silicate.

12. The method of claim 9 wherein said acidic solution has a pH in the range of from about 1 to about 3.

13. The method of claim 12 wherein said alkaline solution is maintained at a pH of between about 7.5 and 9.2 and said thyrobinding globulin and said radioactive isotope-labeled thyroxine are added with said alkaline solution to said sorbent containing said thyroid hormone.

14. The method of claim 13 wherein said sorbent is magnesium silicate.

15. The method of claim 12 wherein said alkaline solution has a pH in the range of from about 10 to about 13.

16. The method of claim 15 wherein said thyrobinding globulin and said radioactive isotope-labeled thyroxine are contained within a third solution and added to said alkaline buffer solution after said eluting, and wherein said third solution has a pH so that the resulting solution of said alkaline solution and said third solution is maintained at a pH of from about 7.5 to about 8.6.

17. The method of claim 15 wherein said sorbent is magnesium silicate.

* * * * *

PO-1050
(5/69)

UNITED STATES PATENT OFFICE
CERTIFICATE OF CORRECTION

Patent No. 3,776,698      Dated December 4, 1973

Inventor(s) Anna M. Eisentraut

It is certified that error appears in the above-identified patent and that said Letters Patent are hereby corrected as shown below:

Col. 2, line 28, "stpes" should be --steps--.
Col. 4, line 56, "Hanbook" should be --Handbook--.
Col. 5, line 52, "the" (second occurrence) should be --then--;
Col. 6, line 54, after "provided", "in" should be --is--.
Col. 7, line 34, after "containing", "0.15M KCl and 0.12M" should be --0.05M KCl and 0.02M--;
       line 46, after "receive a", "storage" should be --source--.
Col. 8, line 35, after "sorbent", "." (period) should be --","--(comma).
Col. 9, line 10, after "standard", "area" should be --sera--.
Col. 11, line 33, "0/1" should be --0.1--.
Col. 12, line 37, TABLE II; second item under the column, "Percent spread", "20.8" should be --28.8--.

Signed and sealed this 16th day of April 1974.

(SEAL)
Attest:

EDWARD M. FLETCHER, JR.
Attesting Officer

C. MARSHALL DANN
Commissioner of Patents